United States Patent
Shen et al.

(10) Patent No.: US 10,916,947 B2
(45) Date of Patent: Feb. 9, 2021

(54) SYSTEM AND METHOD FOR DIRECT CURRENT POWER TRANSMISSION

(71) Applicant: General Electric Company, Schenectady, NY (US)

(72) Inventors: Jie Shen, Shanghai (CN); Zhihui Yuan, Munich (DE); Christof Martin Sihler, Hallbergmoos (DE); Stefan Schroeder, Munich (DE); Mark Aaron Chan, Numich (DE); Fei Xu, Shanghai (CN)

(73) Assignee: GE OIL & GAS UK LTD, Aberdeen (GB)

(*) Notice: Subject to any disclaimer, the term of this patent is extended or adjusted under 35 U.S.C. 154(b) by 0 days.

(21) Appl. No.: 15/129,526

(22) PCT Filed: Mar. 27, 2015

(86) PCT No.: PCT/US2015/023094
§ 371 (c)(1),
(2) Date: Sep. 27, 2016

(87) PCT Pub. No.: WO2015/148977
PCT Pub. Date: Oct. 1, 2015

(65) Prior Publication Data
US 2017/0126008 A1 May 4, 2017

(30) Foreign Application Priority Data
Mar. 27, 2014 (CN) .......................... 2014 1 0119471

(51) Int. Cl.
*H02J 3/36* (2006.01)
*H02J 3/38* (2006.01)
(Continued)

(52) U.S. Cl.
CPC ............... *H02J 3/36* (2013.01); *H02J 3/38* (2013.01); *H02M 7/04* (2013.01); *H02M 7/44* (2013.01); *Y02E 60/60* (2013.01)

(58) Field of Classification Search
CPC ............... H02J 3/36; H02J 3/38; H02M 7/04
(Continued)

(56) References Cited

U.S. PATENT DOCUMENTS 5,477,091 A 12/1995 Fiorina et al.
6,292,379 B1 9/2001 Edevold et al.
(Continued)

FOREIGN PATENT DOCUMENTS

CN 102075106 A 5/2011
CN 103107537 A 5/2013
(Continued)

OTHER PUBLICATIONS

Unofficial English Translation of Chinese Office Action issued in connection with corresponding CN Application No. 201410119471.4 dated Sep. 26, 2016.
(Continued)

*Primary Examiner* — Rexford N Barnie
*Assistant Examiner* — Swarna N Chowdhuri
(74) *Attorney, Agent, or Firm* — Mintz Levin Cohn Ferris Glovsky and Popeo, PC; Lisa Adams

(57) ABSTRACT

A modular substation (10) for subsea applications includes a plurality of modular DC/AC converters (32) configured for converting DC electrical power transmitted along a DC transmission link (24) into AC electrical power for supplying to a plurality of subsea loads (56). The plurality of modular DC/AC converters (32) is configured to couple in series to the DC transmission link (24) and couple in parallel to an AC distribution network (52). At least a first modular DC/AC converter (32) is configured to be selectively elec-
(Continued)

trically and mechanically disconnected from the DC transmission link (24) and the AC distribution network (52) to facilitate maintenance of the first modular DC/AC converters (32) while the AC distribution network (52) continues to supply AC electrical power to at least one of the plurality of subsea loads (56). The modular substation (10) also comprises protection and bypass circuits (26) intended to isolate faulty DC/AC converters (32) and to facilitate safe maintenance and repair.

22 Claims, 7 Drawing Sheets

(51) Int. Cl.
*H02M 7/04* (2006.01)
*H02M 7/44* (2006.01)

(58) Field of Classification Search
USPC .......................................................... 307/31
See application file for complete search history.

(56) References Cited

U.S. PATENT DOCUMENTS

| | | | |
|---|---|---|---|
| 7,633,770 B2 | 12/2009 | Datta et al. | |
| 7,851,943 B2 | 12/2010 | Datta et al. | |
| 7,880,419 B2 | 2/2011 | Sihler et al. | |
| 8,373,307 B2 | 2/2013 | Sihler et al. | |
| 2008/0284249 A1* | 11/2008 | Datta | H02J 3/36 307/36 |
| 2010/0133901 A1* | 6/2010 | Zhang | H02J 3/36 307/11 |
| 2010/0139544 A1* | 6/2010 | Bo | H05K 7/20236 114/337 |
| 2011/0115532 A1 | 5/2011 | Roesner et al. | |
| 2012/0001482 A1 | 1/2012 | Burdick | |
| 2012/0161518 A1* | 6/2012 | Schroeder | H02J 3/01 307/36 |
| 2012/0267955 A1 | 10/2012 | Zhan et al. | |
| 2013/0181532 A1* | 7/2013 | Kjær | H02M 7/523 307/82 |

FOREIGN PATENT DOCUMENTS

| | | | |
|---|---|---|---|
| EP | 2369725 A1 | 9/2011 | |
| EP | 2667498 A1 | 11/2013 | |
| EP | 2667498 A2 * | 11/2013 | ............... H02M 1/00 |
| EP | 2667498 A2 * | 11/2013 | ............... H02M 1/00 |
| EP | 2690635 A1 * | 1/2014 | ............ H01F 27/263 |
| EP | 2690635 A1 * | 1/2014 | ............ H01F 27/263 |

OTHER PUBLICATIONS

Unofficial English Translation of Chinese Office Action issued in connection with corresponding CN Application No. 201410119471.4 dated May 15, 2017.

Parkhideh et al., "A unified Modular Transformer Converter (MTC) system with advanced angle control structure", Energy Conversion Congress and Exposition (ECCE), 2011 IEEE, pp. 3736-3743, Sep. 17-22, 2011.

International Search Report and Written Opinion issued in connection with corresponding PCT application PCT/US2015/023094 dated Jul. 14, 2015.

* cited by examiner

SYSTEM AND METHOD FOR DIRECT CURRENT POWER TRANSMISSION

BACKGROUND

Embodiments of the disclosure relate generally to systems and methods for direct current (DC) electrical power transmission and, more particularly to DC power transmission for subsea applications.

For long-distance power transmission, DC power transmission systems have been developed to replace AC power transmission systems due to cost and/or efficiency reasons. A typical DC power transmission system includes an onshore power converter (e.g., AC/DC converter) which converts AC electrical power received from a power source to DC electrical power. The DC electrical power is transmitted along a power transmission link (also referred to as umbilical) to an offshore substation located on the sea floor. At the offshore substation, the DC power is converted back to AC power which is distributed to individual subsea loads (e.g., motors).

One problem associated with the conventional DC power transmission systems is that the offshore substation may occupy a large physical volume, which can be a significant disadvantage in situations where there are practical restrictions on the size of the substation. Another problem is that the topology of the offshore substation is not arranged in a manner to facilitate easy maintenance when faults occur in the DC power transmission system.

It is desirable to provide systems and methods to address at least some of the above-mentioned problems and/or requirements.

BRIEF DESCRIPTION

To address at least some of the above-mentioned problems and/or requirements, one aspect of the present invention resides in a modular substation for subsea application. The modular substation includes a plurality of modular DC/AC converters configured for converting DC electrical power transmitted along a DC transmission link into AC electrical power for supplying to a plurality of subsea loads. The plurality of modular DC/AC converters is configured to couple in series to the DC transmission link and couple in parallel to an AC distribution network. At least a first modular DC/AC converter is configured to be selectively electrically and mechanically disconnected from the DC transmission link and the AC distribution network to facilitate maintenance of the first modular DC/AC converter while the AC distribution network continues to supply AC electrical power to at least one of the plurality of subsea loads.

Another aspect of the present invention resides in a DC power delivery system. The DC power delivery system includes a transmission end and a receiving end. The transmission end includes at least one power conversion device for converting input electrical power received from at least one power source into DC electrical power. The receiving end is coupled to the transmission end via a DC transmission link for receiving the DC electrical power transmitted from the transmission end and along the DC transmission link. The receiving end includes a plurality of inverter modules and an AC distribution network. Each inverter module has a DC side detachably coupled to the DC transmission link and an AC side for providing AC electrical power converted from the DC side. The AC distribution network is detachably coupled to the AC side of each of the plurality of inverter modules for selectively receiving the AC electrical power therefrom. The AC distribution network is configured for distributing the AC electrical power received from the plurality of inverter modules to a plurality of loads.

Yet another aspect of the present invention resides in a method for operating a DC power delivery system. The method includes delivering DC electrical power along a DC transmission link from a power source located at a first position to a modular substation located at a remote position; converting, by a plurality of modular converters, the DC electrical power into AC electrical power; distributing, by an AC distribution network, the AC electrical power to a plurality of loads around the remote location; and selectively isolating one or more of the modular converters from the DC transmission link and the AC distribution network while continuing to supply AC electrical power to at least one of the plurality of loads.

DRAWINGS

These and other features, aspects, and advantages of the present invention will become better understood when the following detailed description is read with reference to the accompanying drawings in which like characters represent like parts throughout the drawings, wherein.

Figure 7:
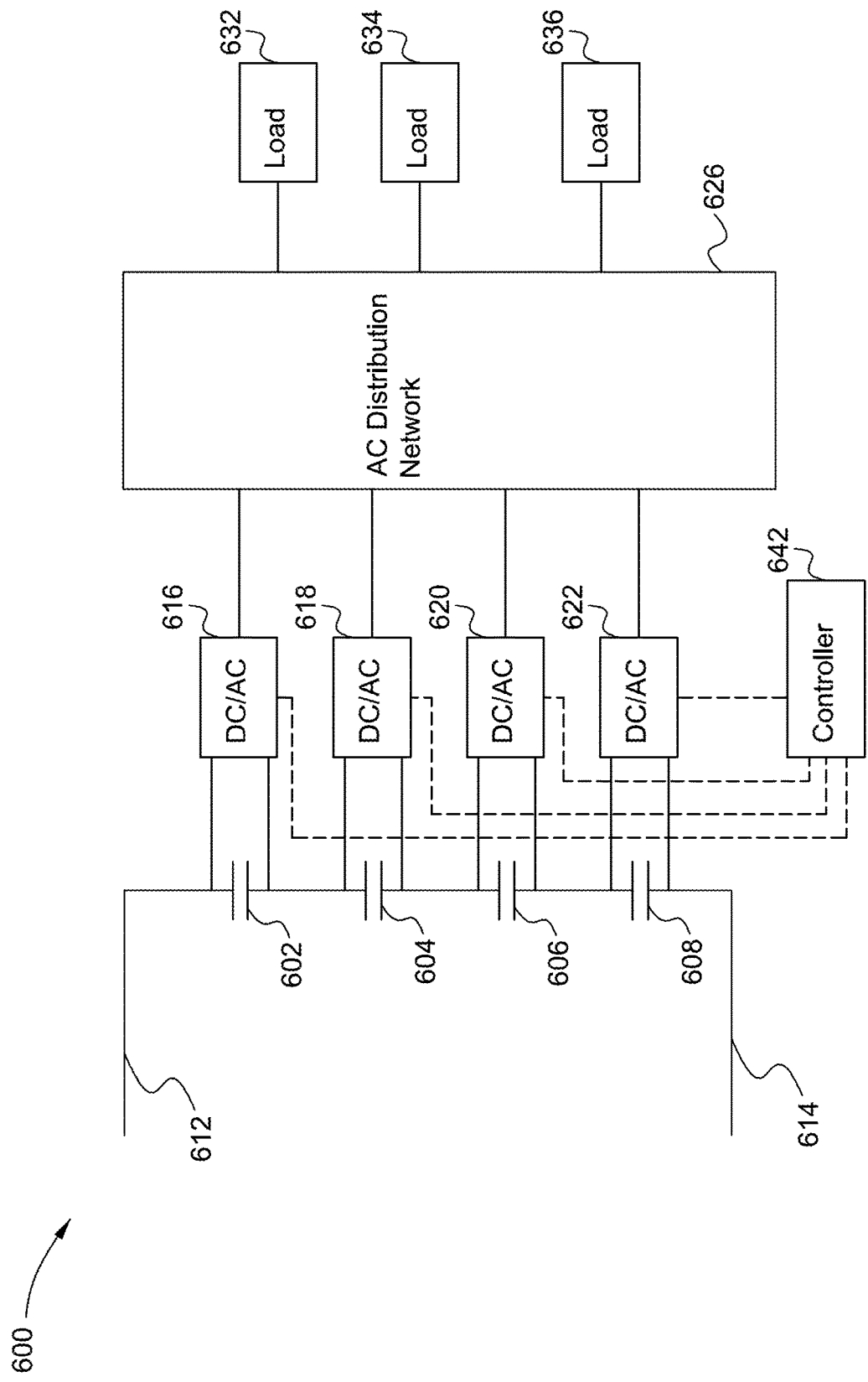
Figure 8:
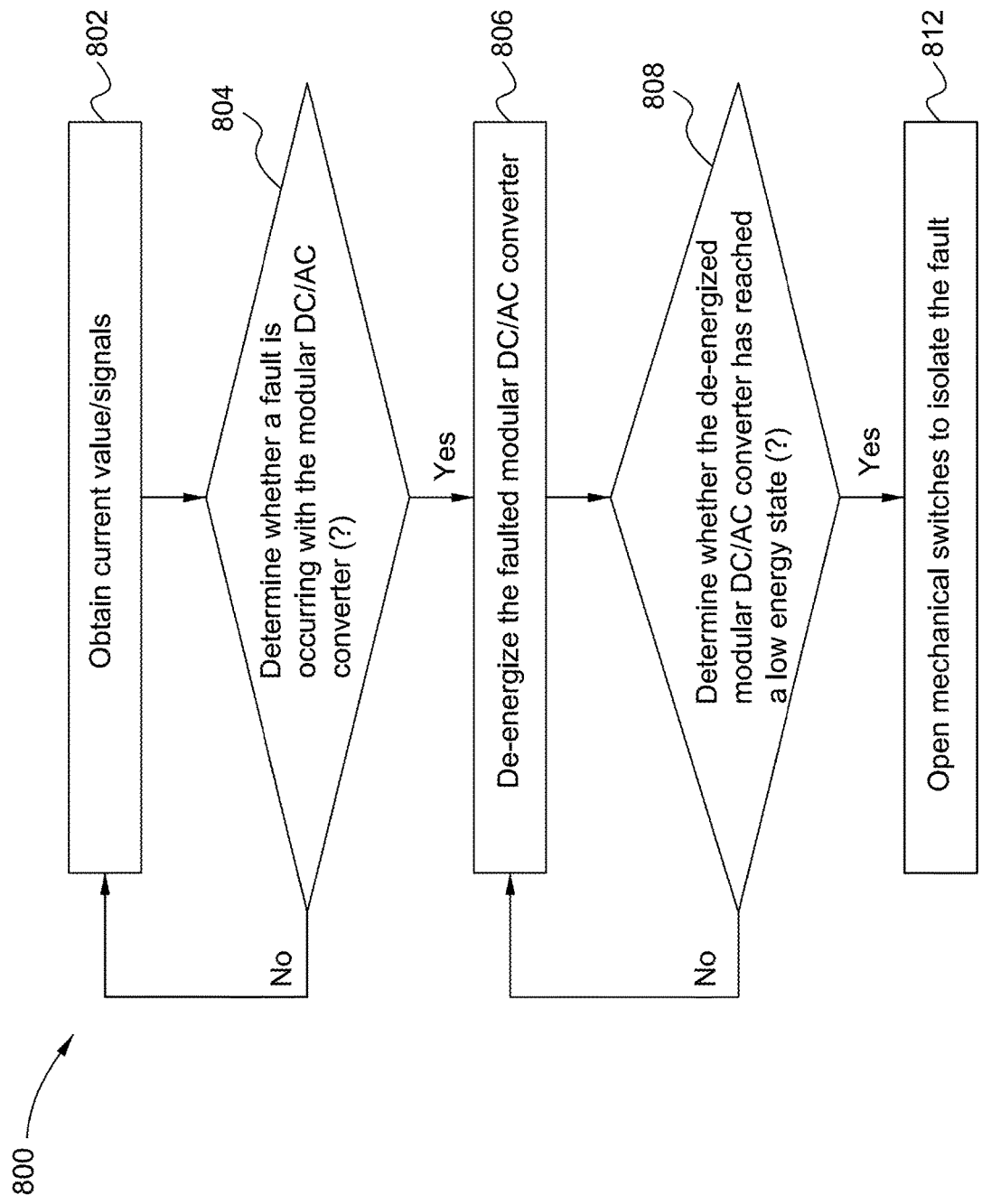

FIG. 7 is a subsea modular station where the DC input voltages applied to the modular DC/AC converters may be controlled by regulating the AC output electrical power in accordance with an exemplary embodiment of the present invention; and FIG. 8 is a flowchart illustrating various actions of operating a DC power transmission system in accordance with an exemplary embodiment of the present invention.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and may be optionally be connected or otherwise coupled together to provide the described function.

Figure 1:
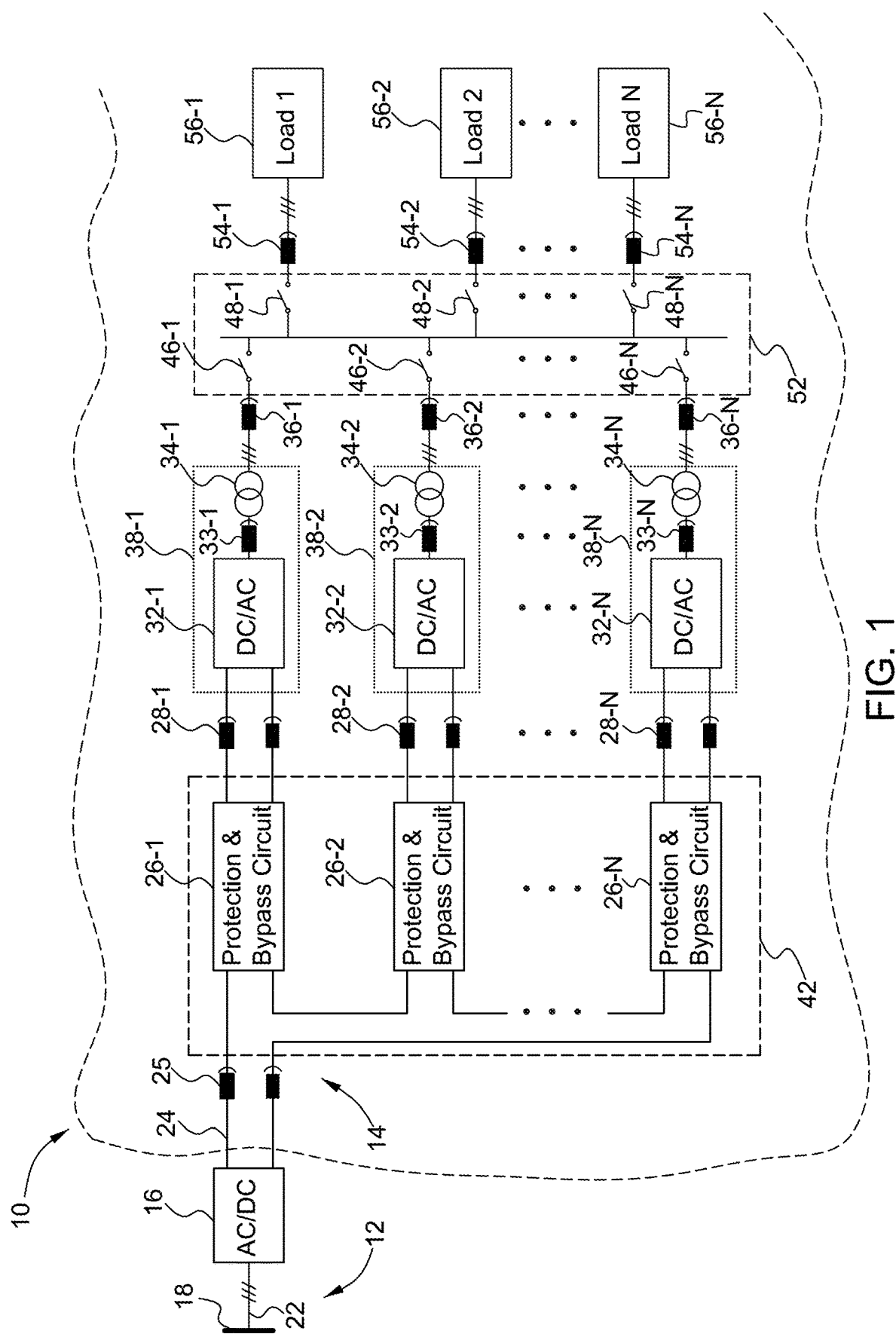
FIG. 1 is a block diagram of a DC power transmission system in accordance with an exemplary embodiment of the present invention.

FIG. 1 illustrates a block diagram of a DC power transmission system 10 in accordance with an exemplary embodiment of the present invention. In the illustrated embodiment, the DC power transmission system 10 is employed in a subsea environment where DC electrical power derived from a power source (onshore or offshore) is transmitted to a subsea modular station for further processing and/or distribution. In other embodiments, the DC power transmission system 10 may be employed in non-subsea environment, such as land, for DC power transmission. As used herein, "subsea" refers to any body of water including oceans, seas, lakes, reservoirs, rivers and any other appropriate waterways.

Referring to FIG. 1, the DC power transmission system 10 includes a transmission end 12 and a receiving end 14 coupled to the transmission end 12 via one or more DC power transmission links 24. The DC electrical power in the DC power transmission system 10 is provided from the transmission end 12 and transmitted along the DC power transmission link 24 to the receiving end 14. In certain embodiments, it is possible that DC electrical power generated from regenerative operations in association with one or more subsea loads at the receiving end 14 may be transmitted along the DC power transmission link 24 to the transmission end 12. In this case, the receiving end 14 is acting as a transmission end and the transmission end 12 is acting as a receiving end.

In one embodiment, the transmission end 12 is positioned at a first location which is typically an onshore location. In another embodiment, the transmission end 12 may also be an offshore location. For example, the transmission end 12 may be a floating platform or a moving marine vessel located at a sea surface. At the transmission end 12, a transmission-end power conversion device 16 is used for providing a DC electrical power in a form suitable for transmission to the receiving end 14 along the DC power transmission link 24. In other embodiments, more than one transmission-end power conversion device 16 may be used for providing the DC electrical power in a suitable form for transmission to the receiving end 14 along the DC power transmission link 24 or a different DC power transmission link 24.

In a specific embodiment, an AC/DC power conversion device 16 is used for converting AC electrical power provided from a power source 18 to a DC electrical power. In one embodiment, the power source 18 may be a power grid which is configured to provide three-phase AC electrical power to the AC/DC power conversion device 16. In other embodiments, the power source 18 may be any other suitable power sources, such as a wind-turbine power generator or a wind-farm with groups of wind turbine power generators, which may be used for supplying AC electrical power to the AC/DC power conversion device 16.

In some embodiments, the transmission-end power conversion device 16 may be a DC-DC power conversion device which is configured to convert a first DC electrical power provided from the power source 18 to a second DC electrical power having a higher voltage level for transmission along the DC power transmission link 24 to the receiving end 14.

Although not illustrated in FIG. 1, the transmission end 12 may further include one or more other elements. For example, one or more protective switchgears may be electrically coupled between the power source 18 and the transmission-end power conversion device 16.

Further referring to FIG. 1, in one embodiment, the DC power transmission link 24 is at least partially submerged within the sea. The DC power transmission link 24 may include a subsea DC transmission cable (also be referred to as umbilical) suitably constructed for carrying DC electrical power with a high voltage (e.g., 50 KV). In some embodiments, the DC power transmission link 24 may also be integrated with one or more signal transmission links for transmitting control signals from the transmission end 12 to the receiving end 14 and/or for transmitting status signals (voltage, current, etc.) from the receiving end 14 to the transmission end 12.

The receiving end 14 is positioned at a second location which is typically an offshore location (also referred to as remote location) under the sea and can be generally referred to as a subsea modular substation. In one embodiment, the receiving end 14 is arranged with a plurality of modular DC/AC converters 32 (labeled 1 through N, also referred to as inverters). In one embodiment, these DC/AC converters 32 are arranged in a redundant manner, for example, N+1 DC/AC converters 32 are provided, where N is a natural number. This redundant modular design allows the DC power transmission system 10 has high power reliability with respect to the subsea loads. That is, the subsea loads may continue to operate even when one of the DC/AC converters 32 has a fault or failure.

In one embodiment, the input terminals of these modular DC/AC converters 32 are serially connected between two DC transmission cables of the DC power transmission link 24. The output terminals of these modular DC/AC converters 32 are connected in parallel to an AC distribution network 52 which will be described in detail below. Each of the plurality of DC/AC converters 32 is operated to separately provide an AC electrical power to the AC distribution network 52. In a more specific embodiment, a plurality of wet-mated connectors 28 is used to couple the inputs or DC sides of the plurality of modular DC/AC converters 32 to the DC power transmission link 24. Each of the modular DC/AC converters 32 is capable of being electrically and mechanically disconnected from the DC power transmission link 24 by disengaging the wet-mated connectors 28. Wet-mated connector refers to a connector which is designed to be engaged and/or disengaged underwater.

Each of the plurality of modular DC/AC converters 32 is configured for converting a portion of the DC electrical power provided from the DC power transmission link 24 into AC electrical power. In one embodiment, the plurality of modular DC/AC converters 32 are configured substantially having the same structure such that the DC voltage at the DC power transmission link 24 is equally applied to these modular DC/AC converters 32. In other embodiments, at least one of these modular DC/AC converters 32 may be configured to have a different structure than the remaining substation modular DC/AC converters.

In some embodiments, the plurality of modular DC/AC converters 32 can be controlled to operate under a quasi-voltage source mode. That is, all the modular DC/AC converters 32 receive the same voltage commands to provide the same AC voltage outputs to the AC distribution network 52. In some embodiments, coordinated operation can be further implemented between these modular DC/AC converters 32. For example, pulse pattern modulators responsible for generating pulse signals for these modular DC/AC converters 32 may be phase-interleaved to improve the AC electrical power quality provided to the AC distribution network 52.

Figure 4:
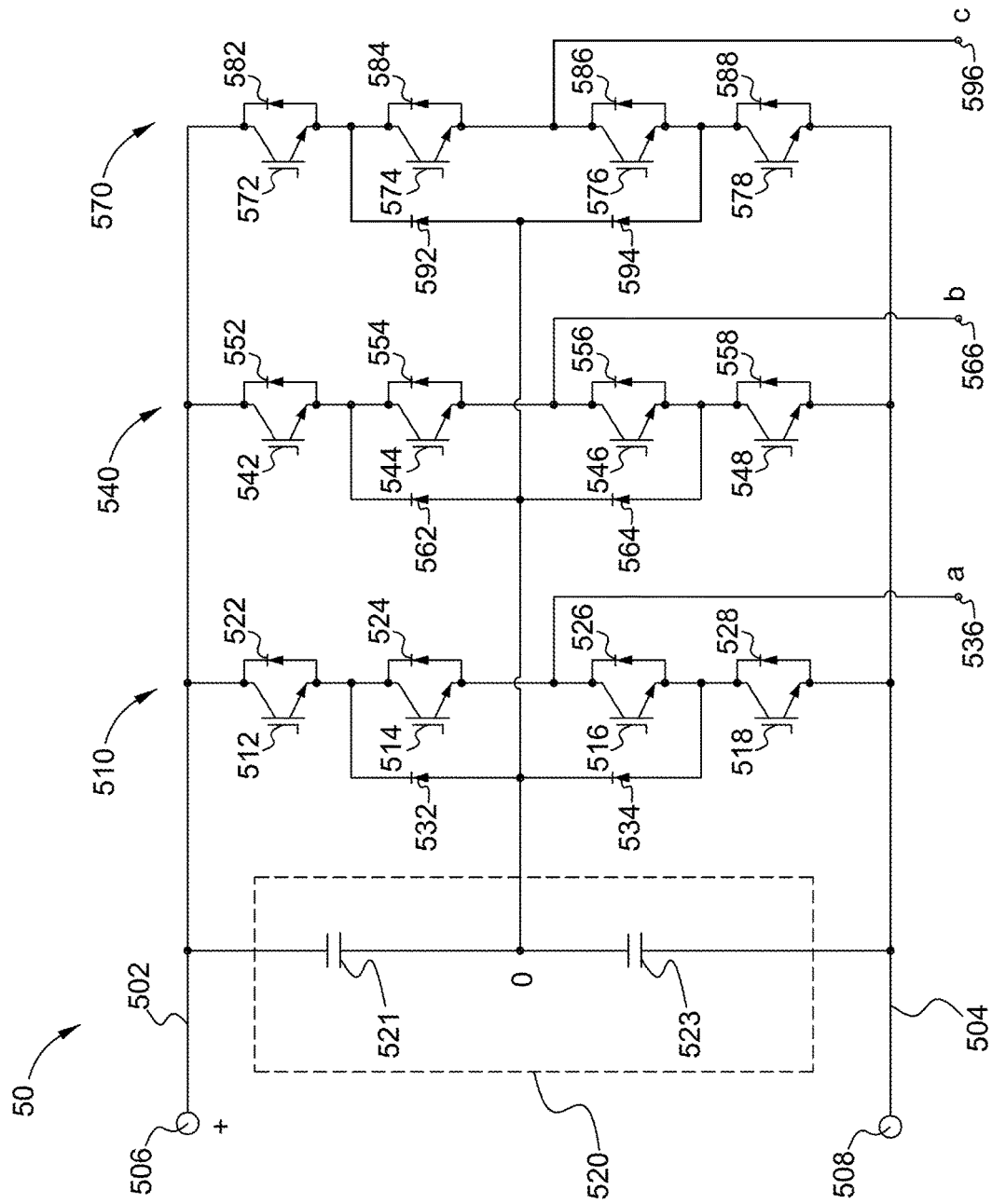
FIG. 4 is a schematic diagram of a modular DC/AC converter in accordance with an exemplary embodiment of the present invention.

In one embodiment, each of the plurality of modular DC/AC converters 32 is configured to minimize the substation's volume and/or footprint. For example, in one embodiment, at least one of the modular DC/AC converters employs an electrical circuit topology that allows the DC electrical power transmitted from the DC transmission link 24 to be directly converted to AC electrical power without using an upfront stage (e.g., a DC-DC converter). A suitable modular DC/AC converter 50 that can be used as the modular DC/AC converters 32 is shown in FIG. 4 in accordance with an exemplary embodiment of the present invention. In other embodiments, the DC/AC converter 50 can be arranged to have other suitable circuit topologies, such as a neutral point piloted (NPP) topology or an active neutral point clamped (ANPC) topology.

As shown in FIG. 4, the modular DC/AC converter 50 is a three-phase converter which is configured for converting DC voltages received from a first input port 506 and a second input port 508 into three-phase AC voltages. More specifically, the DC/AC converter 50 includes a DC link 520 having a first capacitor 521 and a second capacitor 523 coupled in series between a positive connection line 502 and a negative connection line 504. The DC/AC converter 50 further comprises a first phase leg 510 for providing a first phase voltage at a first output port 536, a second phase leg 540 for providing a second phase voltage at a second output port 566, and a third phase leg 570 for providing a third phase voltage at a third output port 596.

In one embodiment, the first phase leg 510 includes four controllable switches 512, 514, 516, 518 coupled in series between the first connection line 502 and the second connection line 504. The first phase leg 520 further includes four diodes 522, 524, 526, 528 coupled in an anti-parallel manner with the four controllable switches 512, 514, 516, 518, respectively. The first phase leg 510 further includes a first clamping diode 532 and a second clamping diode 534. The first clamping diode 532 has an anode coupled to a middle point of the DC link 520 and a cathode coupled to a connection point between the two switches 512, 514. The second clamping diode 534 has an anode coupled to the middle point of the DC link 520 and a cathode coupled to a connection point between the two switches 516, 518. A joint connection defined between the two switches 514, 516 is coupled to the first output port 536.

In one embodiment, the second phase leg 540 includes four controllable switches 542, 544, 546, 548 coupled in series between the first connection line 502 and the second connection line 504. The second phase leg 540 further includes four diodes 552, 554, 556, 558 coupled in an anti-parallel manner with the four controllable switches 542, 544, 546, 548, respectively. The second phase leg 540 further includes a first clamping diode 562 and a second clamping diode 564. The first clamping diode 562 has an anode coupled to the middle point of the DC link 520 and a cathode coupled to a connection point between the two switches 542, 544. The second clamping diode 564 has an anode coupled to the middle point of the DC link 520 and a cathode coupled to a connection point between the two switches 546, 548. A joint connection between the two switches 544, 546 is coupled to the second output port 566.

In one embodiment, the third phase leg 570 includes four controllable switches 572, 574, 576, 578 coupled in series between the first connection line 502 and the second connection line 504. The third phase leg 570 further includes four diodes 582, 584, 586, 588 coupled in an anti-parallel manner with the four controllable switches 582, 584, 586, 588, respectively. The third phase leg 570 further includes a first clamping diode 592 and a second clamping diode 594. The first clamping diode 592 has an anode coupled to the middle point of the DC link 520 and a cathode coupled to a connection point between the two switches 572, 574. The second clamping diode 594 has an anode coupled to the middle point of the DC link 520 and a cathode coupled to a connection point between the two switches 576, 578. A joint connection between the two switches 574, 576 is coupled to the third output port 596.

Referring back to FIG. 1, in some embodiments, the receiving end 14 may further include a plurality of protection and bypass circuits 26 (labeled 1 through N) which are electrically coupled in series between two DC cables of the DC power transmission link 24 by a wet-mated connector 25. In other embodiments, the plurality of protection and bypass circuits 26 may be electrically coupled in series between two DC cables of the DC power transmission link 24 by a dry-mated connector 25. Dry-mate connector refers to a connector which is designed to be engaged and/or disengaged prior to immersion in the water. Each of the plurality of protection and bypass circuits 26 is electrically coupled in parallel with the input terminals of a corresponding modular DC/AC converter 32 via a corresponding wet-mated connector 28. In one embodiment, the plurality of protection and bypass circuits 26 are sealed within a single vessel 42. The vessel used herein refers to a waterproof housing or container which is designed to withstand an appropriate subsea pressure. The vessel 42 may be removed from the DC power transmission system 10 by disengaging the wet-mated connectors 25, 28. Each of the plurality of protection and bypass circuits 26 is capable of being operated to bypass a corresponding modular DC/AC converter 32. This allows the remaining modular DC/AC converters 32 to operate normally when at least one fault (e.g., short-circuit fault and open-circuit fault) is occurring with one of the modular DC/AC converters 32. The plurality of protection and bypass circuits 26 is also capable of being operated to form a short-circuit path when at least one fault is occurring to the DC cables of the DC power transmission link 24.

Figure 2:
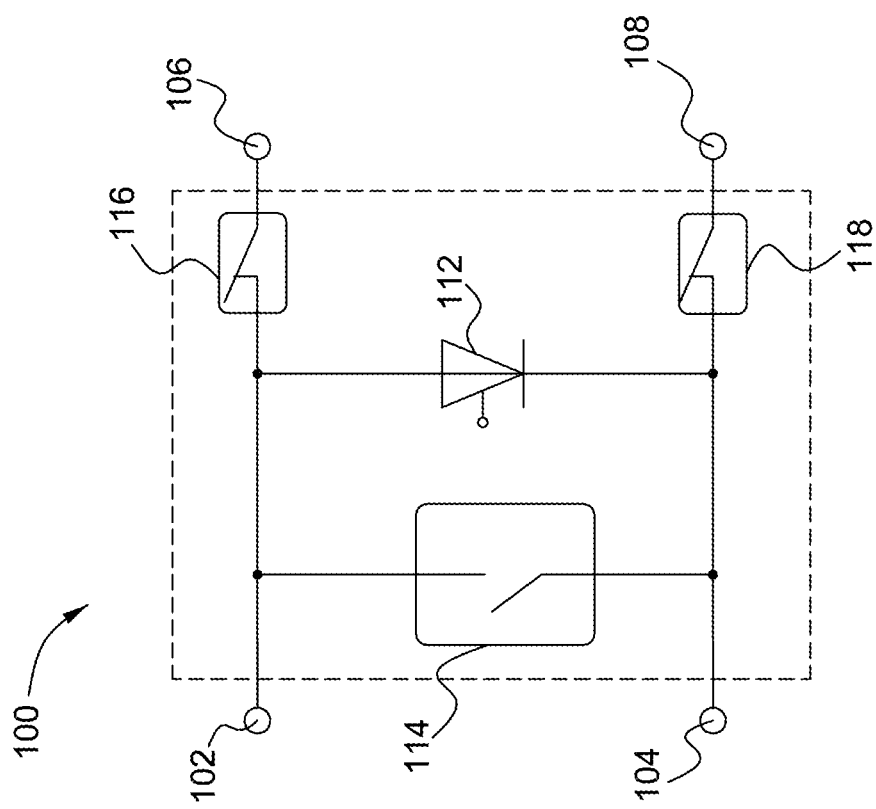
FIG. 2 is a schematic diagram of a protection and bypass circuit in accordance with an exemplary embodiment of the present invention.

A suitable protection and bypass circuit 100 that can be used as the protection and bypass circuit 26 is shown in FIG. 2. Referring to FIG. 2, the protection and bypass circuit 100 includes a first input terminal 102, a second input terminal 104, a first output terminal 106, and a second output terminal 108. The first and second input terminals 102, 104 are electrically coupled to receive DC electrical power transmitted from the two DC transmission cables of the DC power transmission link 24 shown in FIG. 1. The first and second output terminals 106, 108 are electrically coupled to two input terminals of a modular DC/AC converter 32.

With continuing reference to FIG. 2, the protection and bypass circuit 100 further includes a first no-load isolation switch 116, a second no-load isolation switch 118, a first bypass switch 112, and a second bypass switch 114. The first no-load isolation switch 116 is electrically coupled between the first input terminal 102 and the first output terminal 106. The second no-load isolation switch 118 is electrically coupled between the second input terminal 104 and the second output terminal 108. The first bypass switch 112 is electrically coupled in parallel with the second bypass switch 114. In one embodiment, the first bypass switch 112 is a high speed semiconductor switching device which can be operated to create a bypass path in a few microseconds in the event of a fault (e.g., a short-circuit fault). Exemplary semiconductor switching devices that can be used as the first bypass switch 112 include thyristors, IGBTs, IGCTs, and MOSFETs. The second bypass switch 114 is a slow speed switch having a nominal current carrying capability. The second bypass switch 114 may include a mechanical isolation switch which is turned on to further provide a bypass path for the DC electrical power to pass through in the event of a fault (e.g., a short-circuit fault). The first bypass switch 112 can be turned off when the second bypass switch 114 is turned on.

In some cases, the DC cables of the DC power transmission link 24 may be accidentally short circuited, which may damage the DC cables if not dealt with properly. In one embodiment, the first bypass switch 112 is quickly turned on to bypass the short-circuit current generated at the DC cables due to the short-circuit fault. Then the second bypass switch 114 is turned on to further bypass the short-circuit current to protect the DC cables from being damaged. The combination of the first and second bypass switches 112, 114 allows a quick response to the short-circuit fault while maintaining a low level of power loss.

Similarly, the first and second bypass switches 112, 114 can be turned on sequentially when a corresponding modular DC/AC converter coupled to the first and second output ports 106, 108 has a short-circuit fault. The short-circuit fault may be caused by accidentally turning on all the switch devices in one of the three phase legs shown of the modular DC/AC converter. The first and second no-load isolation switches 116, 118 are turned off to isolate the faulted modular DC/AC converter from the DC power transmission link 24. Isolation of the faulted modular DC/AC converter allows maintenance to be provided to the faulted modular DC/AC converter, while continuing to deliver electric power to one or more subsea loads.

Figure 3:
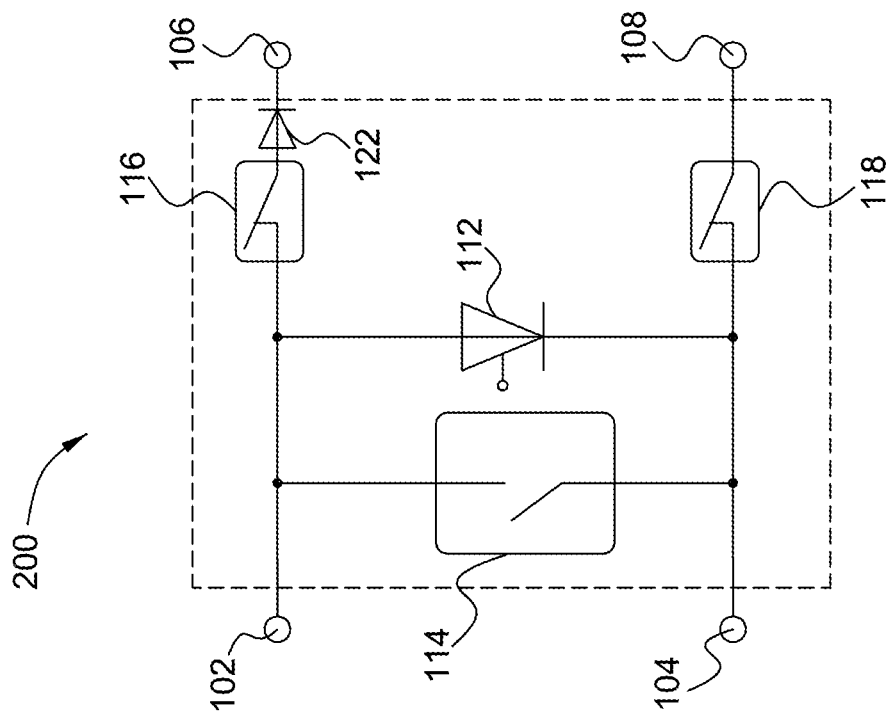
FIG. 3 is a schematic diagram of a protection and bypass circuit in accordance with another exemplary embodiment of the present invention.

Another suitable protection and bypass circuit 200 that may be used as the bypass and protection circuits 26 (see FIG. 1) is shown in FIG. 3. The protection and bypass circuit 200 is substantially similar to the protection and bypass circuit 100 shown in FIG. 2. For example, the protection and bypass circuit 200 also includes a first and second no-load isolation switch 116, 118 and a first and second bypass switch 112, 114. One difference is that the protection bypass circuit 200 further includes a reverse blocking diode 122. In one embodiment, the reverse blocking diode 122 has an anode coupled to the first no-load isolation switch 116 and a cathode coupled to the first output port 106. The reverse blocking diode 122 is configured to prevent the voltage of DC/AC converter 32 from being applied to the first and second input ports 102, 104. This can prevent the short-circuited DC cables from being damaged due to large currents flowing through the DC cables from the modular DC/AC converters 32.

Referring back to FIG. 1, the receiving end 14 may further include a plurality of transformers 34 (labeled 1 through N). In one embodiment, each of the plurality of transformers 34 is electrically coupled to the output terminals of a corresponding modular DC/AC converter 32 via a corresponding dry-mate connector 33. In other embodiments, the dry-mate connectors 33 may be omitted. Each of the plurality of transformers 34 is configured for providing a galvanic isolation between the modular DC/AC converters 32 and subsea loads 56. In some embodiments, the plurality of transformers 34 can be further configured for stepping up or stepping down the voltages of the AC electrical power provided from a corresponding modular DC/AC converter 32 depending on the requirements of the AC distribution network 52 and/or loads 56 of the DC power transmission system 10. In one embodiment, each of the plurality of transformers 34 is sealed within a vessel. In addition, each transformer 34 and a corresponding DC/AC converter 32 are mounted to a frame 38 to allow the transformer 34 and a corresponding converter 32 to be removed from the DC power transmission system 10 for performing maintenance service.

Further referring to FIG. 1, the receiving end 14 may further include an AC distribution network 52 which is electrically coupled to the plurality of transformers 34 and a plurality of loads 56. In a specific embodiment, the AC distribution network 52 may include an AC bus bar 44 for distributing the AC electrical power supplied from the plurality of transformers 34 to the plurality of loads 56.

In one embodiment, the AC distribution network 52 includes a plurality of primary-side switches 46 (labeled 1 through N) and a plurality of secondary-side switches 48 (labeled 1 through N) coupled to the AC bus bar 44. The plurality of primary-side switches 46, the plurality of secondary-side switches 48, and the AC bus bar 44 are typically sealed within a single vessel to allow deployment in the underwater environment. Each of the primary-side switches 46 is electrically coupled to a corresponding transformer 34 via a wet-mated connector 36. In other embodiments, a dry-mate connector 36 may be used to couple each of the primary-side switches 46 to a corresponding transformer 34. In a specific embodiment, the primary-side switches 46 may include a mechanical isolation switch which can be turned off to interrupt electrical current supply when at least one fault is occurring with the modular DC/AC converter 32.

In one embodiment, each of the plurality of secondary-side switches 48 is electrically coupled to a corresponding load 56 via a wet-mated connector 54. The secondary-side switches 48 may include a circuit-breaker which can be turned off to disconnect a corresponding load 56 from the AC distribution network 52 when the load 56 has a fault or failure.

In one embodiment, the plurality of loads 56 may include AC loads such as compressors and pumps operated using AC electrical power (e.g., three-phase AC electrical power) distributed from the AC distribution network 52. In other embodiments, the plurality of loads 56 may include a DC load, in which case an AC/DC converter may be used to convert AC electrical power supplied from the AC distribution network 52 to DC electrical power for the DC load.

Figure 5:
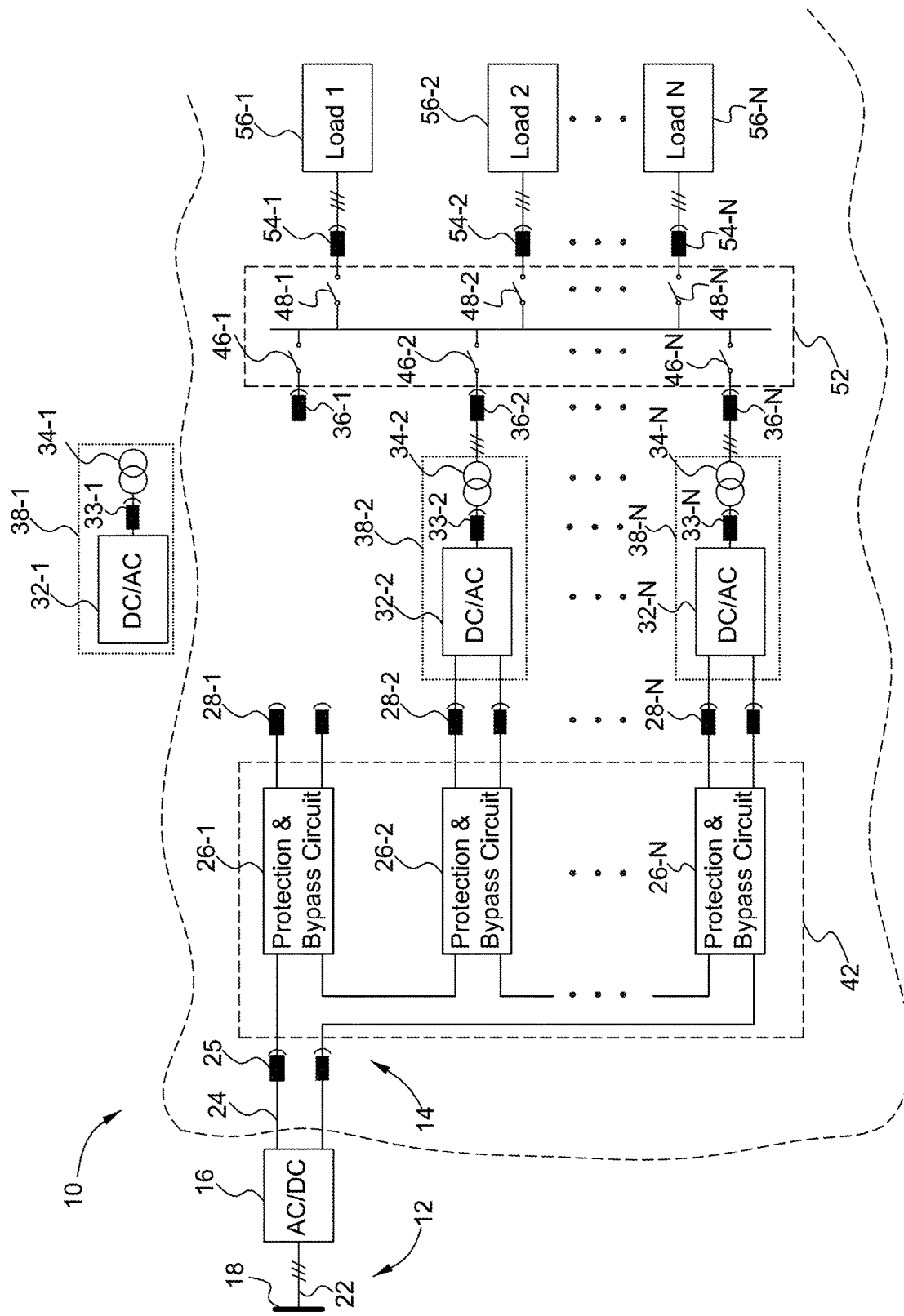
FIG. 5 is an operation state of the DC power transmission system shown in FIG. 1 in accordance with an exemplary embodiment of the present invention.

FIG. 5 illustrates an operation state of the DC power transmission system 10 shown in FIG. 1 in accordance with an exemplary embodiment of the present invention. In some embodiments, a fault, for example, a short-circuit fault may occur to the first modular DC/AC converter 32-1. In response to the short-circuit fault, the first protection and bypass switch 26-1 is operated to create a bypass path (e.g., turning on the first bypass switch 112 and the second bypass switch 114) to bypass the short-circuit current in the first modular DC/AC converter 32-1, which also ensures that the remaining modular DC/AC converters operate properly. The first protection and bypass circuit 26-1 is further operated (e.g., turning off the first and second isolation switches 116, 118) to disconnect the inputs of the first modular DC/AC converter 32-1 from the first protection and bypass circuit 26-1. Further, the first primary-side switch 46-1 is turned off to disconnect the outputs of the first modular DC/AC converter 32-1 or the outputs of the first transformer 34-1 from the AC distribution network 52. As shown in FIG. 5, the first frame 38-1 having the first modular DC/AC converter 32-1 and a first transformer 34-1 mounted therewith is removed from the system 10 by disengaging the wet-mated connectors 28-1 and 36-1. Because the first modular DC/AC converter 32-1 is constructed with an electrical circuit topology that occupies less volume, the first frame 38-1 and be easily lifted out of the sea to perform maintenance.

Figure 6:
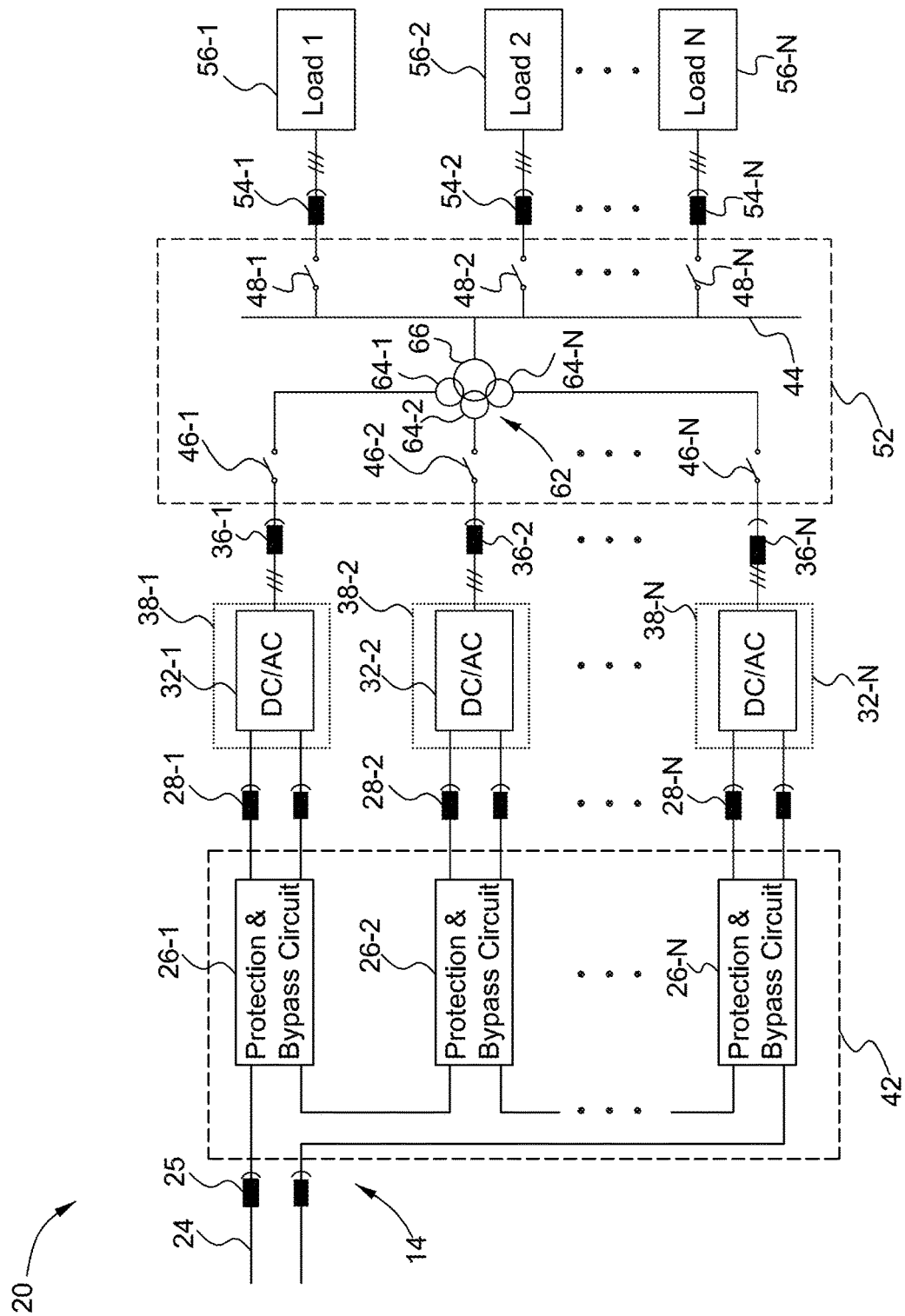
FIG. 6 is a block diagram of a DC power transmission system in accordance with another exemplary embodiment of the present invention.

FIG. 6 illustrates a DC power transmission system 20 in accordance with another exemplary embodiment of the present invention. The DC power transmission system 20 is substantially similar to the DC power transmission system 10 shown in FIG. 1. For purposes of simplified description, the transmission end of the DC power transmission system 20 is omitted here.

Similar components of the DC power transmission system 20 as those described with reference to FIG. 1 will not be described in detail here. In one embodiment, the AC distribution network 52 includes a multi-winding transformer 62 coupled between the plurality of modular DC/AC converters 32 and the AC bus bar 44. The multi-winding transformer 62 provides a galvanic isolation between the plurality of modular DC/AC converters 32 and the plurality of loads 56. In one embodiment, the multi-winding transformer 62 includes a plurality of primary windings 64 (labeled 1 through N) and a secondary winding 66 magnetically coupled to the plurality of primary windings 64. Each of the plurality of primary windings 64 is coupled to a corresponding modular DC/AC converter 32 by a wet-mated connector 36. The plurality of primary windings 64 and secondary winding 66 are configured to step up or step down the voltages of AC electrical power provided from the plurality of modular DC/AC converters 32 depending on the requirements of the AC bus bar 44 or the loads 56. In one embodiment, a primary-side switch 46 is coupled between a modular DC/AC converter 32 and a corresponding primary winding 64. The primary-side switch 46 may include a mechanical isolation switch which can be turned off to allow a corresponding faulted modular DC/AC converter 32 to be isolated and removed from the DC electrical power transmission system 20.

In one embodiment, the AC distribution network 52 may further include a plurality of secondary-side switches 48. Each of the secondary-side switches 48 is coupled to a corresponding load 56 by a wet-mated connector 54. The secondary-side switches 48 may include a circuit-breaker which can be turned off to allow a corresponding load 56 to be disconnected from the DC electrical power transmission system 20 in case at least one of the loads 56 have a fault.

In one embodiment, the plurality of primary-side switches 46, the multi-winding transformer 62, the AC bus bar 44, and the plurality of secondary-side switches 48 are sealed within a single vessel. In some embodiments, the vessel can be removed from the DC power transmission system 20 by disengaging the wet-mated connectors 36, 54 to perform maintenance service.

FIG. 7 illustrates a modular subsea station where the DC input voltages applied to the modular DC/AC converters 32 may be controlled by regulating the AC output electrical power. In the illustrated embodiment, four modular DC/AC converters 616, 618, 620, 622 are shown to facilitate description. In other embodiments, the principles disclosed herein can be applied to a subsea modular station having any suitable number of the modular DC/AC converters. As shown in FIG. 7, a first capacitor unit 602, a second capacitor unit 604, a third capacitor unit 606, and a fourth capacitor unit 608 are coupled in series between the two DC cables 612, 614. Although each capacitor unit is shown including a single capacitor, in other embodiments, each capacitor unit may include any suitable number of capacitors. Because the four capacitor units 602, 604, 606, 608 are coupled in series, the current flowing through the four capacitor units 602, 604, 606, 608 is the same which is controlled to be a constant value in this embodiment. The total voltage across the four capacitor units 602, 604, 606, 608 can be expressed by the following equation:

$$V=V_1+V_2+V_3+V_4 \tag{1}$$

where $V_1$ is the first voltage across the first capacitor unit 602, $V_2$ is the second voltage across the second capacitor unit 604, $V_3$ is the third voltage across the third capacitor unit 606, $V_4$ is the fourth voltage across the fourth capacitor unit 608, and V is the total voltage across the fourth capacitor units 602, 604, 606, 608.

During operation, it is desirable to have the total voltage V be equally distributed among the four capacitor unit 602, 604, 606, 608. However, voltage imbalance may occur to these capacitor units which may result in a high voltage stress on one of the modular DC/AC converters. Voltage imbalance refers to at least one of the capacitor unit having a voltage higher or lower than the average voltage of the four capacitor units. To solve this voltage imbalance problem, in one embodiment, the individual voltages at these capacitor units are indirectly controlled by regulating the individual AC electrical power output as well as the total AC electrical power provided from four modular DC/AC converters 616, 618, 622, 624. The total AC electrical power can be expressed by the following equation:

$$P=P_1+P_2+P_3+P_4 \tag{2}$$

where $P_1$ is the first AC electrical power provided from the first modular DC/AC converter 616, $P_2$ is the second AC electrical power provided from the second modular DC/AC converter 618, $P_3$ is the third AC electrical power provided from the third modular DC/AC converter 622, $P_4$ is the fourth AC electrical power provided from the fourth modular DC/AC converter 624, P is the total AC electrical power provided from the four modular DC/AC converters.

As shown in FIG. 7, the AC electrical power provided from the four modular DC/AC converters 616, 618, 620, 622 are provided to AC distribution network 626 which is further distributed to a plurality of loads. Although three loads 632, 634, 636 are shown, in other embodiments, any suitable number of loads can be employed.

In a specific embodiment, the first voltage at the first capacitor unit 602 may have a voltage higher than the average voltage of the four capacitor units 602, 604, 606, 608. In this case, the first modular DC/AC converter 616 is controlled according to control signals sent from the controller 642 to provide increased first AC electrical power to an AC distribution network 626. This can be achieved by increasing the AC electrical power reference value associated with the first modular DC/AC converter 616. The increased first AC electrical power output results in a voltage reduction at the first capacitor unit 602. Because the total AC electrical power provided from the four modular DC/AC converters are maintained at a constant value and the electrical current flowing through the four capacitors 602, 604, 606, 608 is also a constant value, the total voltage across the four capacitor units remain unchanged. As a result, the voltages at the other three capacitors are increased. Therefore, the four capacitor units 602, 604, 606, 606 are regulated from an imbalanced state to a balanced state.

FIG. 8 is a flowchart illustrating various actions of a method 800 for operating the DC electrical power transmission systems shown in FIGS. 1 and 6 in accordance with an exemplary embodiment of the present invention. The method 800 may be programmed with software algorithm or instructions stored in a non-transitory computer-readable storage medium which, when executed by a processor, perform various actions of the method 800. The non-transitory computer-readable storage medium may include volatile and nonvolatile, removable and non-removable media implemented in any method or technology. The computer-readable storage medium includes, but is not limited to, RAM, ROM, EEPROM, flash memory, CD-ROM, digital versatile disks (DVD), magnetic cassettes, magnetic tape, magnetic disk storage, or any other non-transitory computer-readable storage medium which can be used to store the software algorithm or instructions.

In one implementation, the method 800 may start at block 802, in which various current values/signals are obtained. In one embodiment, the current values/signals may represent electrical currents flowing along the link between one of output of the plurality of modular DC/AC converters 32 and a corresponding primary-side switch 46. In another embodiment, the current values/signals may represent electrical current flowing along the link between one of the loads 56 and a corresponding secondary-side switch 48. In a specific embodiment, one or more current sensors may be used to obtain the current values/signals. In other embodiments, the current values/signals may be stored in a memory device associated with a controller of the DC electrical power transmission system. The controller may include any suitable programmable circuits or devices such as a digital signal processor (DSP), a field programmable gate array (FPGA), a programmable logic controller (PLC), and an application specific integrated circuit (ASIC).

At block 804, the method 800 determines whether a fault is occurring with the DC electrical power transmission system or more specifically with the modular DC/AC converters. The determination may be made by ascertaining whether the obtained current values/signals exceed a threshold value. If the obtained current values/signals exceed the threshold value which means at least one short-circuit fault is occurring with the modular DC/AC converter, the procedure moves forward to block 806. If the obtained current values/signals do not exceed the threshold value which means there is no fault occurring with the modular DC/AC converter, the procedure goes back to block 802.

At block 806, the method 800 de-energizes the faulted modular DC/AC converter. In one embodiment, de-energizing the faulted modular DC/AC converter is achieved by stopping one of the modular DC/AC converters 32 that have a short-circuit fault. More specifically, in one embodiment, the controller may stop providing pulse signals or gating signals to the switching devices of the modular DC/AC converter to de-energize the faulted modular DC/AC converter.

At block 808, the method 800 determines whether the de-energized modular DC/AC converter has reached a low energy state. This determination can be achieved by determining whether the DC voltage at the modular DC/AC converter has fallen below a threshold value. If the DC voltage is lower than the threshold value, the procedure goes to block 812. If the DC voltage is greater than the threshold value, the procedure goes back to block 806.

At block 812, the method 800 opens or turns off the primary-side switch that is associated with the faulted modular DC/AC converter 32 such that the faulted modular DC/AC converter 32 is isolated from the AC distribution network. Because the primary-side switch is operated at a low energy state, a mechanical isolation switch can be used to interrupt the current path so that the DC electrical power transmission system in the undersea environment can be operated more reliable.

The method 800 described above may include additional blocks. For example, the method 800 may include a block for resuming the operation after the faulted modular DC/AC converter has been repaired.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A modular substation for subsea application, comprising:
   a plurality of modular DC/AC converters configured for converting DC electrical power transmitted along a DC transmission link into AC electrical power for supplying to a plurality of subsea loads, wherein each of the plurality of modular DC/AC converters includes a pulse pattern modulator configured to generate phase interleaved pulse signals that improve the quality of AC electrical power provided to an AC distribution network, the DC transmission link including one or more signal transmission links integrated therein, each of the one or more signal transmission links configured to transmit control signals to the plurality of modular DC/AC converters; and
   a controller coupled to the plurality of modular DC/AC converters via the one or more signal transmission links integrated within the DC transmission link and through respective capacitors on a DC side of the plurality of modular DC/AC converters, the controller operable to an output of the plurality of modular DC/AC converters and a primary-side switch of the AC distribution network, the controller further operable to send control signals, via the signal transmission links, to the plurality of modular DC/AC converters through the respective capacitors to balance the DC voltages at the inputs of the plurality of modular DC/AC converters such that the voltage at the respective capacitors is regulated by maintaining a total AC electrical power of the AC distribution network at a constant value; wherein the plurality of modular DC/AC converters are configured to couple in series to the DC transmission link and couple in parallel to the AC distribution network; and
   wherein at least a first modular DC/AC converter is configured to be selectively electrically and mechanically disconnected from the DC transmission link and the AC distribution network to facilitate maintenance of the first modular DC/AC converter while the AC distribution network continues to supply AC electrical power to at least one of the plurality of subsea loads.

2. The modular substation of claim 1, further comprising a plurality of protection and bypass circuits coupled in series to the DC transmission link, each of the plurality of protection and bypass circuit being coupled in parallel to a corresponding modular DC/AC converter, each of the plurality of protection and bypass circuit being configured to operate in a normal mode in which the DC electrical power is transmitted to the corresponding modular DC/AC converter and in a fault mode in which the corresponding DC/AC converter is bypassed and isolated.

3. The modular substation of claim 2, wherein the plurality of protection and bypass circuits is accommodated within a single vessel and each of the plurality of modular DC/AC converters is accommodated within a dedicated vessel.

4. The modular substation of claim 2, wherein at least one of the protection and bypass circuits is selectively electrically and mechanically coupled to a corresponding DC/AC converter via at least one DC-side connector.

5. The modular substation of claim 2, wherein at least one of the protection and bypass circuits comprises at least one blocking diode coupled between the DC transmission link and at least one modular DC/AC converter.

6. The modular substation of claim 2, wherein at least one of the protection and bypass circuits comprises at least one isolation switch coupled between the DC transmission link and the at least one modular DC/AC converter.

7. The modular substation of claim 1, further comprising a plurality of AC-side isolation switches, each of the plurality of AC-side isolation switches is coupled between a corresponding modular DC/AC converter and an AC bus bar of the AC distribution network.

8. The modular substation of claim 7, wherein the AC-side isolation switch comprises a no-load isolation switch.

9. The modular substation of claim 7, wherein the plurality of isolation switches and the AC bus bar are accommodated within a single vessel.

10. The modular substation of claim 1, further comprising a plurality of transformers, each of the plurality of transformers being coupled between a corresponding modular DC/AC converter and the AC distribution network, and wherein each of the modular DC/AC converter and the corresponding transformer connected thereto are mounted to a single frame.

11. The modular substation of claim 1, further comprising a multi-winding transformer coupled between the plurality of modular DC/AC converters and the AC distribution network, wherein the multi-winding transformer and the AC distribution network are accommodated within a single vessel.

12. The modular substation of claim 1, wherein at least one of the plurality of modular DC/AC converters is coupled to the AC distribution network via at least one AC-side connector to allow the modular DC/AC converter to be electrically and mechanically disconnected from the AC distribution network.

13. A DC power delivery system, comprising:
a transmission end comprising at least one power conversion device for converting input electrical power received from at least one power source into DC electrical power; and
a receiving end coupled to the transmission end via a DC transmission link for receiving the DC electrical power transmitted from the transmission end and along the DC transmission link, the receiving end comprising:
a plurality of inverter modules, each inverter module having a DC side detachably coupled to the DC transmission link and an AC side for providing AC electrical power converted from the DC side, the DC transmission link including one or more signal transmission links integrated therein, each of the one or more signal transmission links configured to transmit control signals to the plurality of inverter modules;
an AC distribution network detachably coupled to the AC side of each of the plurality of inverter modules, the AC distribution network being configured to distribute the AC electrical power received from the plurality of inverter modules to a plurality of loads, wherein each of the plurality of inverter modules includes a pulse pattern modulator configured to generate phase interleaved pulse signals that improve the quality of AC electrical power provided to the AC distribution network; and
a controller coupled to the plurality of inverter modules via the one or more signal transmission links integrated within the DC transmission link and through respective capacitors on the DC side of the plurality of inverter modules, the controller operable to receive via the signal transmission links, status signals from a current sensor positioned between an output of the plurality of inverter modules and a primary-side switch of the AC distribution network, the controller further operable to send control signals, via the signal transmission links, to the plurality of inverter modules through the respective capacitors to balance the DC voltages at the inputs of the plurality of inverter modules such that the voltage at the respective capacitors is regulated by maintaining a total AC electrical power of the AC distribution network at a constant value;
wherein the at least one power conversion device is configured to be selectively electrically and mechanically disconnected from the DC transmission link and the AC distribution network while the AC distribution network continues to supply AC electrical power to at least one of the plurality of loads.

14. The DC power delivery system of claim 13, wherein the receiving end comprises a plurality of no-load isolation switches, each no-load isolation switch is coupled between the AC side of a corresponding inverter module and the AC distribution network, and wherein the inverter module is configured to stop operation to facilitate the open of a corresponding no-load isolation switch upon occurrence of at least one fault.

15. A method for operating a DC power delivery system, comprising:
delivering DC electrical power along a DC transmission link from a power source located at a first position to a modular substation located at a remote position, the DC transmission link including one or more signal transmission links integrated therein;
converting, by a plurality of modular converters, the DC electrical power into AC electrical power, wherein the converting includes generating phase interleaved pulse signals by a pulse pattern modulator included in each of the plurality of modular converters and the DC electrical power is converted into AC electrical power based on the generated phase interleaved pulse signals;
transmitting control signals, from a controller, to the plurality of modular converters via the one or more signal transmission links integrated within the DC transmission link and through respective capacitors on a DC side of the plurality of modular converters to balance the DC voltage as inputs of the plurality of modular converters;

adjusting the AC electrical power output by the plurality of modular converters to regulate the DC voltage of the capacitor at the DC side of the plurality of modular converters by maintaining the total AC electrical power output from the plurality of modular converters at a constant valve;

distributing, by an AC distribution network, the AC electrical power to a plurality of loads around the remote location;

receiving, via the signal transmission links, status signals from a current sensor positioned between an output of the plurality of modular converters and a primary-side switch of the AC distribution network; and selectively electrically and mechanically disconnecting one or more of the modular converters from the DC transmission link and the AC distribution network while continuing to supply AC electrical power to at least one of the plurality of loads.

16. The method of claim 15, further comprising:
selectively actuating at least one protection and bypass circuit to bypass the at least one modular converter.

17. The method of claim 15, further comprising: de-energizing at least one of the modular converters; and
opening at least one no-load isolation switch to isolate the corresponding modular converter.

18. The modular substation of claim 1, further comprising connectors to disconnect the at least a first modular DC/AC converter from the DC transmission link and the AC distribution network.

19. The modular substation of claim 2, wherein the connectors are wet connectors.

20. The method of claim 15, wherein the selectively mechanically disconnecting the one or more of the modular converters further includes removing the one or more of the modular converters by selectively disconnecting connectors.

21. The modular substation of claim 1, wherein the controller is further operable to receive, via the transmission links, status signals from a current sensor configured between the plurality of loads and a secondary-side switch of the AC distribution network.

22. The modular substation of claim 1, wherein the plurality of DC/AC converters are configured in a neutral point piloted topology or an active neutral point clamped topology.

* * * * *